(12) United States Patent
Ishizaki et al.

(10) Patent No.: US 6,484,314 B1
(45) Date of Patent: Nov. 19, 2002

(54) EXCEPTION HANDLING METHOD AND SYSTEM

(75) Inventors: Kazuaki Ishizaki, Tokyo-to (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/417,858

(22) Filed: Oct. 14, 1999

(30) Foreign Application Priority Data

Oct. 19, 1998 (JP) ............................................ 10-296293

(51) Int. Cl.⁷ ................................................. G06F 9/45
(52) U.S. Cl. ........................ 717/151; 717/150; 717/153
(58) Field of Search ................................. 717/151, 155, 717/159, 129, 140, 131, 137, 143, 145, 148, 150, 156, 153; 712/233; 714/38

(56) References Cited

U.S. PATENT DOCUMENTS

| | | | | |
|---|---|---|---|---|
| 4,875,160 A | * | 10/1989 | Brown, III ................... | 712/228 |
| 5,197,138 A | * | 3/1993 | Hobbs et al. ................ | 712/222 |
| 5,481,719 A | * | 1/1996 | Ackerman et al. ........... | 709/108 |
| 5,606,696 A | * | 2/1997 | Ackerman et al. ........... | 709/108 |
| 5,692,169 A | * | 11/1997 | Kathail et al. .............. | 712/244 |
| 5,761,513 A | * | 6/1998 | Yellin et al. ................. | 717/127 |
| 5,815,702 A | * | 9/1998 | Kannan et al. .............. | 712/244 |
| 5,881,280 A | * | 3/1999 | Gupta et al. ................. | 712/244 |
| 5,933,635 A | * | 8/1999 | Holzole et al. .............. | 717/151 |
| 5,950,006 A | * | 9/1999 | Crater et al. ................ | 717/140 |
| 5,999,731 A | * | 12/1999 | Yellin et al. ................. | 717/126 |
| 6,026,485 A | * | 2/2000 | O'Connor et al. ........... | 712/226 |
| 6,085,312 A | * | 7/2000 | Abdallah et al. ............ | 712/208 |
| 6,092,185 A | * | 7/2000 | Slegel et al. ................ | 712/219 |
| 6,131,187 A | * | 10/2000 | Chow et al. ................. | 717/106 |
| 6,202,204 B1 | * | 3/2001 | Wu et al. ..................... | 717/151 |
| 6,240,548 B1 | * | 5/2001 | Holzle et al. ................ | 717/140 |
| 6,247,171 B1 | * | 6/2001 | Yellin et al. ................. | 717/126 |

OTHER PUBLICATIONS

Ferreira et al, "Explicit representation of exception handling in the development of dependable component based system", IEEE, HASE, pp 1–12, 2001.*
Ryu et al, "Exception analysis for multithread Java programs", IEEE, pp 23–30, 2001.*
Ogasawara et al, "A study of exception handling and its dynamic optimization in Java", ACM OPPSLA, pp 83–95, 2001.*
Lee et al, "Efficient Java exception handling in just in time compilation", ACM Java, pp 1–8, 2000.*
Dony, "Exception handling and object orienetd programming towards a synthesis", ACM OOPSLA, pp 322–330, 1990.*

* cited by examiner

Primary Examiner—Ani Khatri
(74) Attorney, Agent, or Firm—Scully, Scott, Murphy & Presser; Marian Underweiser, Esq.

(57) ABSTRACT

The present invention provides a method and a system for generating an exception handling instruction and for avoiding the execution of unnecessary instructions. More particularly, an internal opcode in a compiler is read and one internal opcode is obtained. Whether or not the obtained internal opcode is an instruction for which exception checking is required is determined. If exception checking is required for the opcode, an exception checking instruction having a sequence of bits that are uniquely determined must be generated in accordance with the type of exception, without generating an instruction for substituting into a register a label indicating the type of exception. Then, a processor instruction is generated corresponding to the obtained internal opcode. The above processing is repeated for the remaining internal opcode, and an exception handling instruction is generated. An exception checking instruction is an instruction for determining whether an exception condition is established, and for branching to an exception handler when the exception condition is established.

10 Claims, 4 Drawing Sheets

EXCEPTION HANDLING METHOD AND SYSTEM

BACKGROUND OF THE INVENTION

1. Technical Field

The present invention relates to a method and a system for increasing the speed of exception handling, in particular, to a method and a system for minimizing the number of instructions required for exception check handling, and to a medium for storing a program therefor.

2. Prior Art

In order to ensure, in a language processing system, the safety of a program written by a user, the detection of exceptions in a program written in a conventional language must be performed frequently so as to determine whether illegal pointer accesses have occurred or whether an index array is within a correct range. For example, in Java (trademark of Sun Microsystems, Inc.), when the following conditions are not satisfied, exceptions of types corresponding to individual conditions occur in order to ensure the safety of a program:

When the field of an object is to be accessed, the address of the object is not null.

When an element of an array is to be accessed, the address of the array is not null, and the index of the array falls within a correct range.

A divisor for the division of an integer is not 0.

In the C, C++ and FORTRAN languages, exception checks are not performed at the time of execution. In order to increase the speed of a program, such as a Java program frequently performing exception checking, the overhead required for exception checking must be minimized. In a compiler, even a reduction involving only one instruction can contribute greatly to an increase in the execution speed.

Conventionally, and mainly in the following two cases is processing performed when it is determined during the execution of a program that a condition exists for which an exception handling is required, and when an exception has occurred.

When a branching destination can be freely set (When both a comparison instruction and a branching instruction are employed).

When a branching destination used in common is set (an instruction is employed for branching, in a specific condition, to a handler prepared by an OS).

The outlines of the processing performed in these two cases will now be described.

<Case Wherein a Destination of a Branching Instruction can be Freely Set>

A jump destination (ERROR_HANDLING1, 2) for each exception condition is prepared for the code to examine an exception condition while an operation is being executed. When an exception condition is established, the code at the jump destination is executed. Pseudo-code for the operation is shown below.

Check for exception condition 1

When condition 1 is established, jump to ERROR_HANDLING1.

. . .

. . .

Check for exception condition 2

When condition 2 is established, jump to ERROR_HANDLING2.

. . .

ERROR_HANDLING:

Set exception type 1.

Jump to an exception handler.

ERROR_HANDLING2:

Set exception type 2.

Jump to an exception handler.

In the above code, it is assumed that the underlined instructions are processes that are not required for normal processing during which no exceptions occur. If in response to the occurrence of an exception a comparison instruction or a branching instruction can be used to indicate the type of exception, program control can branch directly to an exception handler without any unnecessary branching being performed.

<Case where a jump destination of a branching instruction is used in common>

Pseudo-code for a condition wherein a jump destination of a branching instruction is used in common is shown below.

Set exception type 1.

Check for exception condition 1.

When exception condition 1 is established, jump to ERROR_HANDLING.

. . .

. . .

Set exception type 2.

Check for exception condition 2.

When exception condition 2 is established, jump to ERROR_HANDLING.

ERROR_HANDLING:

Obtain an exception type.

In the above code, it is assumed that the underlined instructions are processes that are not required for normal processing during which no exceptions occur. If a comparison instruction or a branching instruction can be used to indicate the type of exception, the execution of unnecessary instructions can be avoided when no exception occurs.

It is, therefore, an object of the present invention to provide a method and a system for generating an exception handling instruction and for avoiding the execution of unnecessary instructions.

It is also an object of the present invention to provide a method and a system for generating exception handling instructions without generating an instruction for substituting into a register a label indicating a type of exception.

It is another object of the present invention to provide a method and a system for generating an exception handling instruction by employing a comparison instruction or a branching instruction indicating the type of exception.

It is an additional object of the present invention to provide a method and a system for generating an exception handling instruction by employing an instruction for checking an exception and for branching to an exception handler.

It is a further object of the present invention to provide a method and a system for generating an exception handling instruction and for generating code having a small size.

It is one further object of the present invention to provide, in accordance with the contents of the memory at an address whereat the processing branches to an exception handler, an exception handling method and system for determining the type of exception that has occurred.

It is yet one more object of the present invention to provide, in accordance with the contents of the memory before and after an address whereat the processing branches to an exception handler, an exception handling method and system for determining the type of exception that has occurred.

SUMMARY OF THE INVENTION

To achieve the above objects, first, internal opcode in a compiler is read and one internal opcode is obtained.

Whether or not the obtained internal opcode is an instruction for which exception checking is required is determined. If exception checking is required for the opcode, an exception checking instruction having a sequence of bits that are uniquely determined must be generated in accordance with the type of exception, without generating an instruction for substituting into a register a label indicating the type of exception. Then, a processor instruction is generated corresponding to the obtained internal opcode. The above processing is repeated for the remaining internal opcode, and an exception handling instruction is generated. An exception checking instruction is an instruction for checking whether an exception condition is established, and for branching to an exception handler when the exception condition is established.

At the step for the execution of a exception handling, when an exception occurs, an address is obtained whereat program control branches to the exception handler, and the contents of the memory at the address are read. The type of exception that has occurred is determined in accordance with the contents of the memory (bit pattern), and then an exception handling is performed in accordance with the type of exception that has been determined. The contents of the memory equivalent to or greater than one instruction may be read from the obtained address and its preceding and succeeding addresses.

Specifically in order to minimize the overhead of the exception handling in a sequence of instructions to be executed, an exception checking instruction is so generated that an instruction which is to be inserted into the code portion for normal operation is minimized to check whether the exception occurs. When an exception occurs, the pertinent address is obtained during an exception handling routine, and a sequence of instructions at the preceding and succeeding addresses are decoded. The decoded instructions are employed to determine the type of exception that has occurred.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
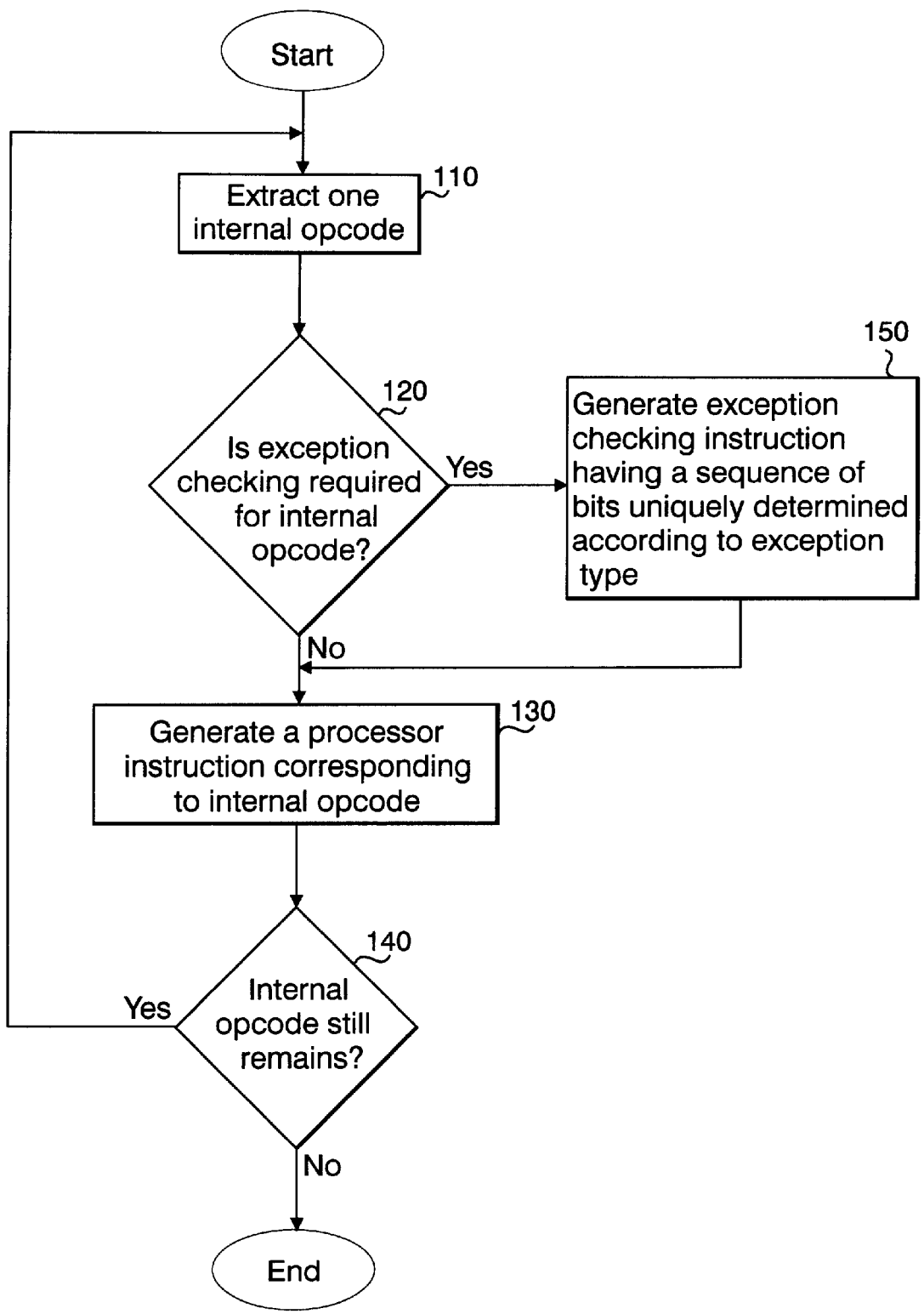
FIG. 1 is a flowchart showing the processing performed by the present invention when generating an exception checking instruction.

FIG. 1 is a flowchart showing the processing according to the present invention for the generation of an exception handling instruction. At step 110 internal opcode in a compiler is read and one internal opcode is extracted. At step 120 a check is performed to determine whether the extracted internal opcode is an instruction for which exception checking is required. If the decision is YES, at step 150 an exception checking instruction is generated that includes a sequence of bits uniquely determined in accordance with the type of exception to be examined. Program control then moves to step 130. If the decision at step 120 is NO, at step 130 a processor instruction is generated corresponding to the extracted internal opcode. At step 140 a check is performed to determine whether unprocessed internal opcode still remain. If any unprocessed internal opcode remain, program control returns to step 110.

Figure 2:
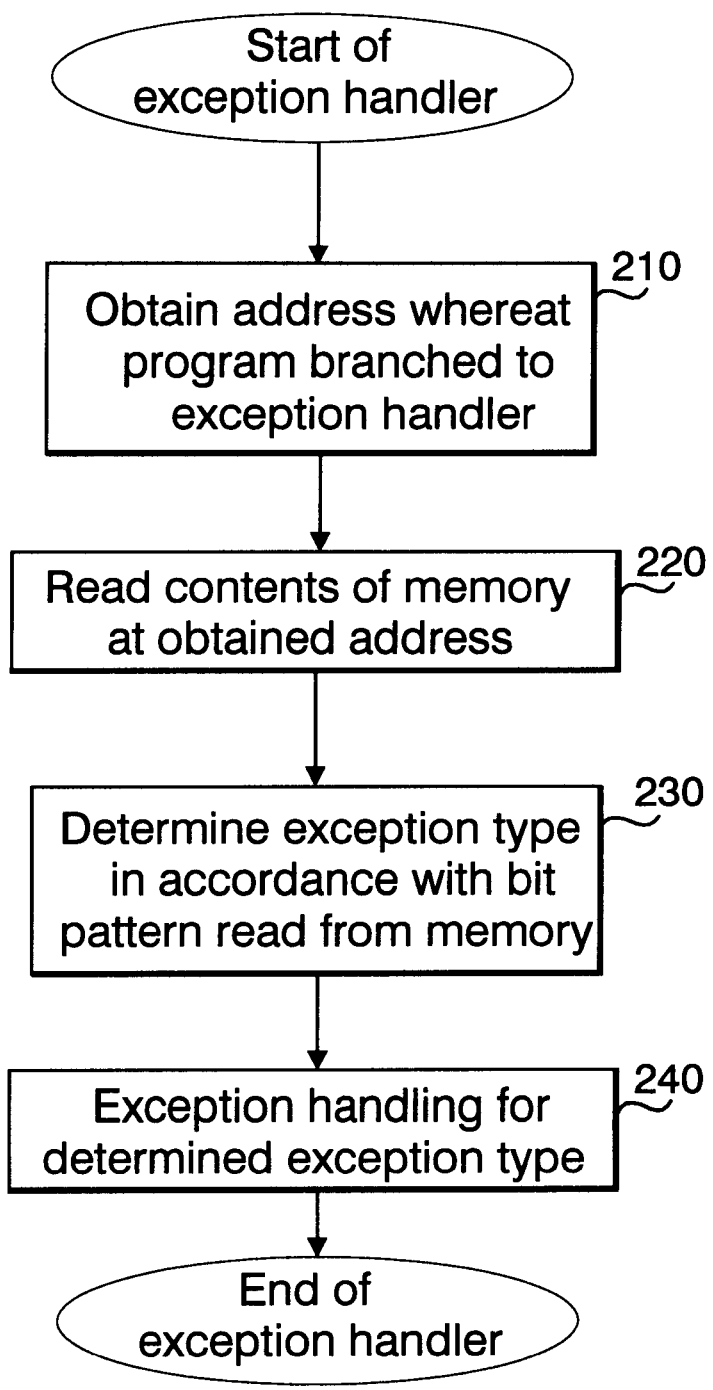
FIG. 2 is a flowchart showing the processing performed by the present invention before the execution handling is begun.

FIG. 2 is a flowchart showing the processing performed before the execution of the exception handling. At step 210, in response to the occurrence of an exception, an address whereat the processing branched to an exception handler is obtained. At step 220 the contents of the memory at the obtained address are read. At step 230 the type of exception that occurred is determined in accordance with the read bit pattern. At step 240 the exception handling is performed in accordance with the determined exception type. It should be noted that at step 220 the contents of the memory equivalent to or greater than one instruction may be read at the obtained address and at its preceding and succeeding addresses.

Figure 3:
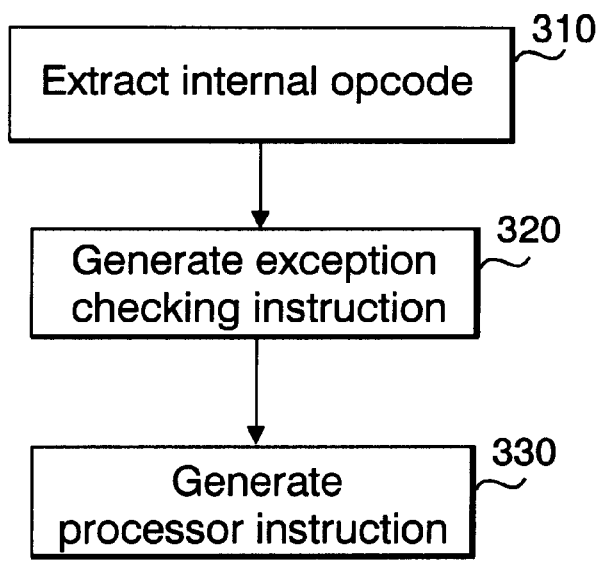
FIG. 3 is a flowchart showing the processing performed by an exception handling system according to the present invention.

FIG. 3 is a flowchart showing the exception handling system according to handling performed by a system according to the present invention. Block 310 is an internal opcode extraction block for reading internal opcode in a compiler and for extracting one internal opcode. Block 320 is an exception check instruction generation block. At block 320 a check is performed to determine whether the extracted internal opcode is an instruction for which exception checking is required. If so, an exception checking instruction is generated that includes a sequence of bits uniquely determined in accordance with the type of exception to be examined. Block 330 is a processor instruction generation block. At block 330 a processor instruction is generated corresponding to the extracted internal opcode.

As is described above, according to the method or the system of the present invention, an instruction that substitutes a label indicating the type of exception into a register is not generated by the invention but is generated by a conventional compiler. As a result, the compiled code size can be reduced, and the execution speed increased.

An instruction generator and an exception handler according to the present invention will now be described in more detail.

The instruction generator inserts into a normal execution path (other than a path executed only when an exception occurs) only that code which is required at the minimum to check whether an exception occurs. At this time, the following two points are taken into account.

When no exception has occurred, instructions other than a comparison instruction and a branching instruction should not be generated in order to maintain the execution speed.

Since in an exception handler a sequence of instructions is decoded, it is determined that an unique instruction (or an unique sequence of instructions) should be generated corresponding to each of the above types of instruction.

In most cases, a processor includes an instruction for performing processing at high speed when a designated condition is not established, and for branching to a system trap vector when the condition is established. For example, with the PowerPC (trademark of IBM) and the SPARC (trademark of SPARC International, Inc.), whether r31 is a null can be determined quickly using the following sequence of instructions.
PowerPC:
   twi r31, 0
SPARC:
   cmp %g31, %g0
   teq 16

In the processing for extracting an array element as a word and for dividing their values by a variable, example code for generating a sequence of instructions in AIX is shown below that uses a PowerPC instruction.

// r5: array base address
   // r6: array size
   // r7: divisor
   twi eq, r5, 0 //check whether array address is a null
   tw ge, r4, r6 //check array index
   slwi r4, r4, 2 //r4=r4 * 4
   lwzx r3, r4(r5)
   twi llt, r7, 1 //check 0 divisor
   divi r3, r3, r7

The first instruction used for the 0 CHECK of the array address is employed to determine whether or not r5 is 0. The fifth instruction used for the 0 CHECK of the "divisor" is for determining whether or not r7 is 0. Although the conditions for these two instructions are the same, since an instruction (a sequence of instructions) generated for each exception type is uniquely determined, two different instructions representing the same condition, r=0 and |r|<1, are employed.

The tw/twi instructions are instructions that perform comparison and branching at the same time, so that when a condition described in the operand is established, program control branches to a handler designated by the OS.

Shown below is example code for the exception handler that branches at the twi/tw instructions.

```
void TrapHandler(struct context *cp)
{
    iar=cp->IAR; //address whereat an exception has occurred
    if IS_TRAPI_EQ(iar){ //is an instruction at iar address formed as 'twi eq'?
        process_NULL_POINTER_EXCEPTION( );
    } else if IS_TRAP_GE(iar){
        process_ARRAY_OUTOFINDEX_EXCEPTION( );
    } else if IS_TRAPI_LLT(iar){
        process_ARITHMETIC_EXCEPTION( );
    }
}
```

When a condition described in the tw/twi instructions is established and the processing branches to the exception handler, instructions at the addresses preceding and succeeding iar (in the above example, only the instruction at the iar address since comparison and branching are performed in response to a single instruction) are examined to detect the type of exception that has occurred. When, for example, a program is executed with r7=0 in the above example, "twi llt, r7, 0" satisfies the condition, and program control moves to the exception handler. In the exception handler, the address iar, whereat the exception has occurred, is obtained and the instruction at the address iar is examined. Since IS_TRAPI_LLT(iar) has been established, the ARITHMETIC_EXCEPTION( ) processing is performed in accordance with the detected exception type.

If the method of the present invention is applied for a Java compiler, when compared with the conventional processing method an increase in speed of 10 to 15% can be expected for a benchmark that frequently employs as a reference an array such as is used for BubbleSort or QuickSort.

The following two conditions for hardware use are required in order to implement the present invention.
   The implementation of an instruction prepared to provide high speed comparison and branching.
   The ability of a handler at a branching destination to acquire an instruction address at a branching destination.

Figure 4:
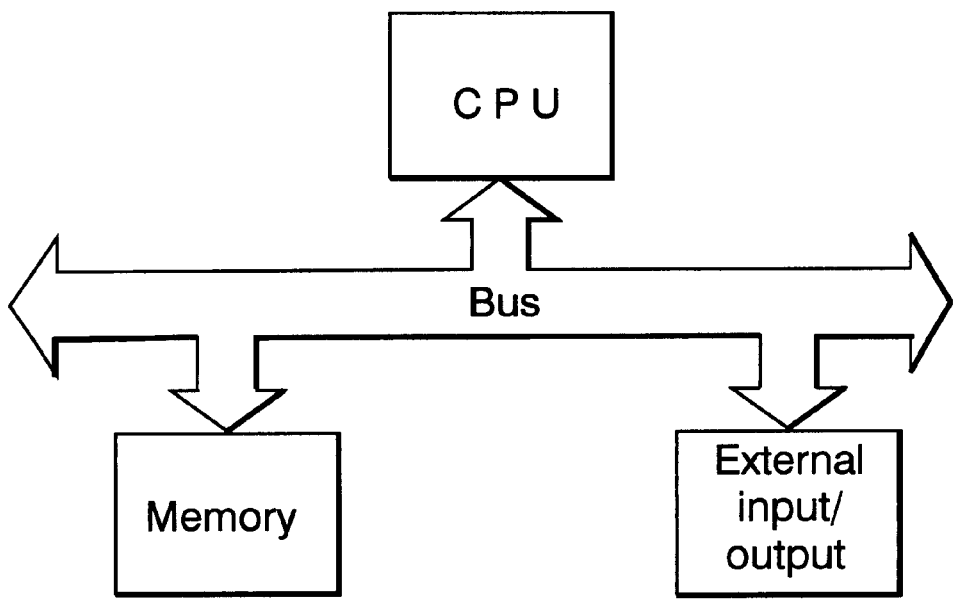
FIG. 4 is a diagram showing the hardware arrangement that is required at the least to implement the present invention.

In FIG. 4 is shown the hardware arrangement that at the minimum is required to implement the present invention. An arrangement is required wherein, at the least, a bus connects a memory and an external input/output device to a general processor.

Figure 5:
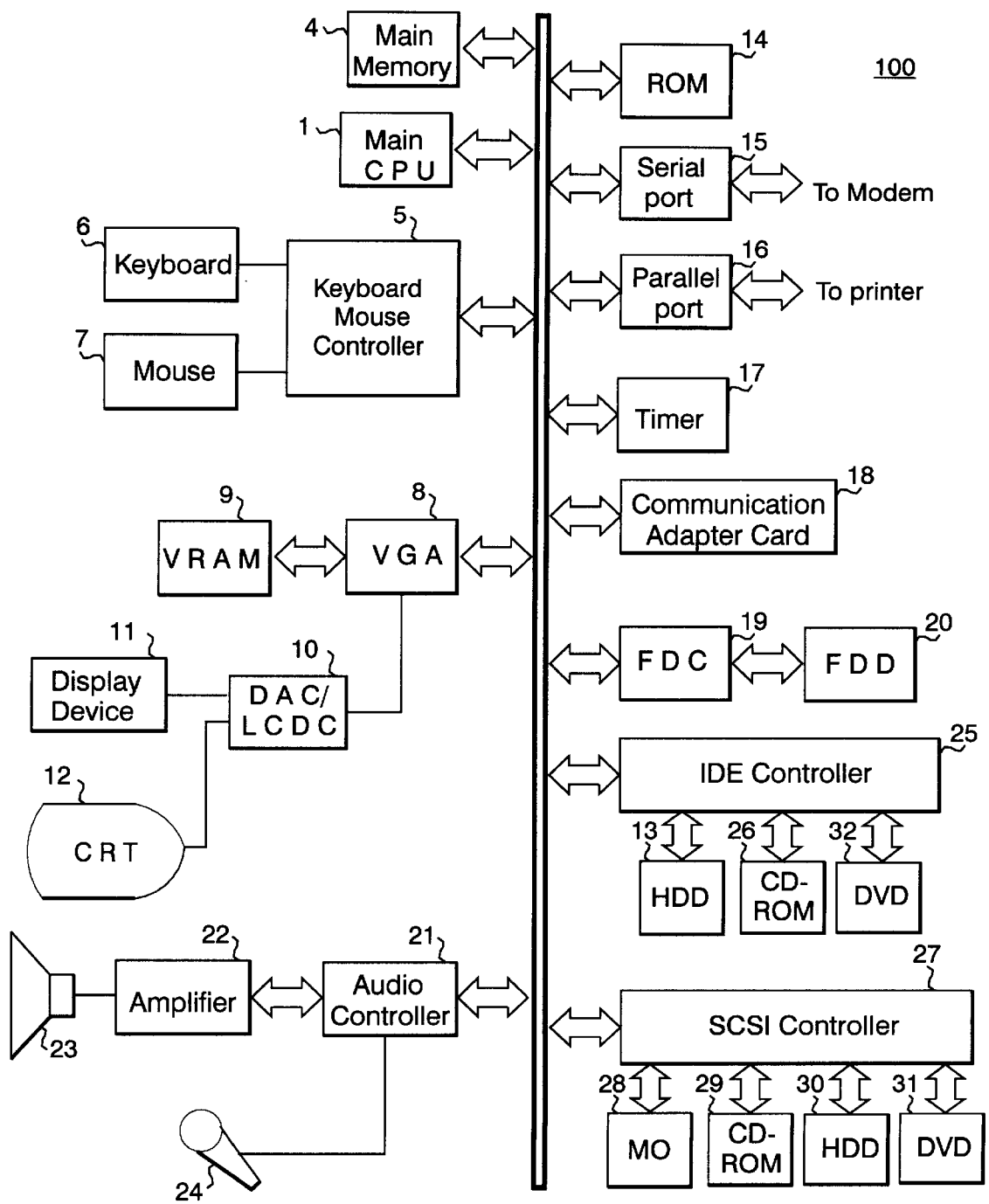
FIG. 5 is a diagram showing the general hardware arrangement of the system of the present invention.

In FIG. 5 is shown the general hardware arrangement for a system according to the present invention. A system 100 comprises a central processing apparatus (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. Similarly, the CPU 1 and the memory 4 are connected by the bus 2 and a SCSI controller 27 to a hard disk drive 30 (or to a storage medium drive, such as an MO 28, a CD-ROM 29 or a DVD 31), which is an auxiliary storage device, while a floppy disk drive 20 is connected to the bus 2 via a floppy disk controller 19. A multi-CPU configuration may also be employed for the present invention.

A floppy disk is inserted into the floppy disk drive 20, and code or data for a computer program, which interacts with an operating system and issues instructions to the CPU 1 for implementing the present invention, can be stored on the floppy disk or on the hard disk drive 13 (or on the MO, the CD-ROM 26 or the DVD 32), and in a ROM 14. This computer program is executed by loading it into the memory 4. The code for the computer program can be compressed, or can be divided into a plurality of segments for storage on a plurality of storage mediums.

The system 100 further comprises user interface hardware components such as a pointing device (a mouse or a joystick) 7 and a keyboard 6 for entering data, and a display device 12 for providing visual data for a user. Furthermore, a printer can be connected to the system 100 via a parallel port 16, or a modem can be connected via a serial port 15. For communicating with another computer, the system 100 can be connected to a network via the serial port 15 and a modem, or via a communication adaptor 18 (an ethernet or a token ring card). A remote transceiver is connected to the serial port 15, or to the parallel port 16, for exchanging data with the system 100 using infrared rays or wires.

A loudspeaker 23 is used to receive, via an amplifier 22, an audio signal produced by D/A conversion (digital/analog conversion) performed by an audio controller 21, and to output the signal as sound. The audio controller 21 performs the A/D (analog/digital) conversion of audio information received via a microphone 24 in order to introduce external audio data into the system 100.

As is described above, it would be easily understood that the system of the present invention can be provided by a normal personal computer (PC); a workstation, a notebook PC or a palmtop PC; a network computer, a television set or another electric home appliance that incorporates a computer; a game machine having a communication function; a communication terminal having a communication function, such as a telephone, a facsimile machine, a portable telephone, a PHS or a PDA; or a combination of the components described above. It should be noted, however, that these components are merely examples and not all of them are required for the present invention.

Accordingly, the present invention provides a method and a system for generating an exception checking instruction and for avoiding the execution of unnecessary instructions. As a result, an exception checking instruction can be generated for which the compiled size is small and the execution speed is increased.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for reading internal opcode in a compiler and for generating an instruction for exception handling, comprising the steps of:
   (1) obtaining one internal opcode;
   (2) determining whether or not said obtained internal opcode is an instruction for which exception checking is required;
   (3) if said exception checking is required for said opcode, generating an exception checking instruction having a sequence of bits that are uniquely determined in accordance with the type of exception, without generating an instruction for substituting into a register a label indicating the type of exception;
   (4) generating a processor instruction corresponding to said obtained internal opcode; and
   (5) repeating said steps (1) to (4) for the remaining internal opcode.

2. The method according to claim 1, wherein at said step (3) of generating an exception checking instruction, said exception checking instruction is an instruction for determining whether an exception condition is established, and for branching to an exception handler when said exception condition is established.

3. An exception handling method comprising:
   (1) when an exception occurs, obtaining an address where at program control branches to an exception handler;
   (2) reading the contents of a memory at said address;
   (3) determining the type of exception that has occurred in accordance with said contents of said memory; and
   (4) performing an exception handling in accordance with the type of exception that has been determined.

4. The exception handling method according to claim 3, wherein said step (2) of reading said contents of said memory is a step of reading, from said obtained address and preceding and succeeding addresses, the contents of a memory equivalent to or greater than one instruction.

5. A system for reading internal opcode in a compiler and for generating an instruction for exception handling, comprising:
   (1) means for obtaining one internal opcode;
   (2) means for, if said obtained internal opcode is an instruction for which exception checking is required, generating an exception checking instruction having a sequence of bits that are uniquely determined in accordance with the type of exception, without generating an instruction for substituting into a register a label indicating the type of exception; and
   (3) means for generating a processor instruction corresponding to said obtained internal opcode.

6. The system according to claim 5,, wherein, in said means (2) for generating said exception checking instruction, said exception checking instruction is an instruction for determining whether an exception condition is established, and for branching to an exception handler when said exception condition is established.

7. An exception handling system comprising:
   (1) means for, when an exception occurs, obtaining an address where at program control branches to an exception handler;
   (2) means for reading the contents of a memory at said address;
   (3) means for determining the type of exception that has occurred in accordance with said contents of said memory; and
   (4) means for performing an exception handling in accordance with the type of exception that has been determined.

8. The exception handling system according to claim 7, wherein said means (2) for reading said contents of said memory is means for reading, from said obtained address and preceding and succeeding addresses, the contents of a memory equivalent to or greater than one instruction.

9. A storage medium for storing a program for permitting a computer to read internal opcode in a compiler and to generate an instruction for exception handling, said program comprising:
   (1) a function for obtaining one internal opcode;
   (2) a function for determining whether or not said obtained internal opcode is an instruction for which exception checking is required;
   (3) a function for, if said exception checking is required for said opcode, generating an exception checking instruction having a sequence of bits that are uniquely determined in accordance with the type of exception, without generating an instruction for substituting into a register a label indicating the type of exception;
   (4) a function for generating a processor instruction corresponding to said obtained internal opcode; and
   (5) a function for repeating said functions (1) to (4) for the remaining internal opcode.

10. A storage medium for storing a program for permitting a computer to perform exception handling, said program comprising:
   (1) a function for, when an exception occurs, obtaining an address where as program control branches to an exception handler;
   (2) a finction for reading the contents of a memory at said address;
   (3) a function for determining the type of exception that has occurred in accordance with said contents of said memory; and
   (4) a unction for performing an exception handling in accordance with the type of exception that has been determined.

* * * * *

UNITED STATES PATENT AND TRADEMARK OFFICE
CERTIFICATE OF CORRECTION

PATENT NO. : 6,484,314 B1
DATED : November 19, 2002
INVENTOR(S) : K. Ishizaki et al.

It is certified that error appears in the above-identified patent and that said Letters Patent is hereby corrected as shown below:

<u>Title page,</u>
Item [56], References Cited, U.S. PATENT DOCUMENTS, "Holzole et al." should read -- Holzle et al. --
OTHER PUBLICATIONS, "orienetd" should read -- oriented --

<u>Column 8,</u>
Line 5, "5,," should read -- 5, --
Line 55, "finction" should read -- function --
Line 60, "unction" should read -- function --

Signed and Sealed this

Thirteenth Day of May, 2003

JAMES E. ROGAN
*Director of the United States Patent and Trademark Office*